Dec. 10, 1935.   J. A. RUSSO   2,023,772

CLUTCH FOR MARINE ENGINES

Filed Oct. 12, 1934

Joseph A. Russo
Inventor

By A. M. Bunn
Attorney

Patented Dec. 10, 1935

2,023,772

UNITED STATES PATENT OFFICE 2,023,772

CLUTCH FOR MARINE ENGINES

Joseph A. Russo, New Orleans, La.

Application October 12, 1934, Serial No. 748,119

2 Claims. (Cl. 192—69)

This invention relates to improvements in friction plates for use in a clutch of that type used particularly in connection with marine engines, and comprehends a construction, including tapering co-acting faces, so designed as to eliminate slipping after engagement.

More particularly this development comprehends inclined contacting clutch faces in which the angles of inclination of each plate is from opposite peripheral points inward to a medial line across the structure so that, upon engagement, a positive locking engagement is obtained.

Other features will more clearly hereinafter appear, by reference to the accompanying specification and drawing, together with the appended claims, and in which like characters of reference designate corresponding parts throughout the several views in which;

Figure 1:
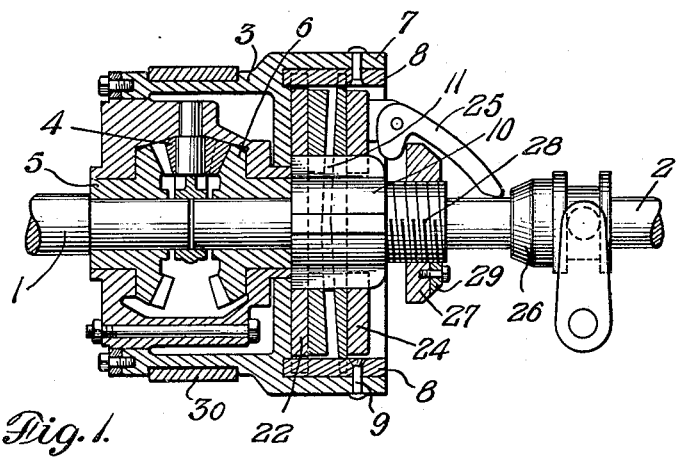
Fig. 1 is a longitudinal section through the assembly.

Referring now to the drawing, reference character 1 designates a drive shaft, and 2 the driven shaft. A conventional differential, including the rotary casing 3, carrying the spider gears 4 which mesh with gear 5, fixed on the drive shaft 1, and fixed gear 6 on the driven shaft 2, is incorporated in the disclosure to illustrate the operation and position of the clutch assembly and its parts. The gear casing 3 includes a cylindrical housing 7 for the clutch and in which are fixed the ribs 8, by means of rivets 9, for positioning certain of the clutch elements, as more clearly hereinafter described. The driven shaft 2 is formed axially of the housing 7 with an enlarged portion 10 slotted for the reception of keys 11, by means of which the alternate clutch plates are positioned.

Figure 2:
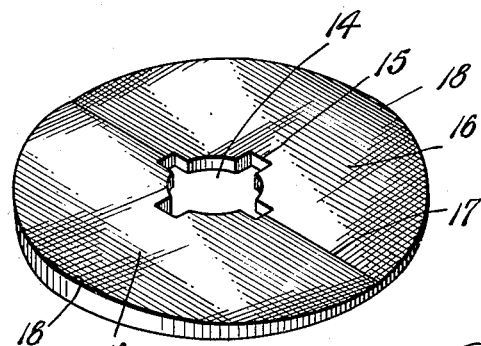
Figs. 2 and 3 are perspective views of the clutch plate.
Figure 3:
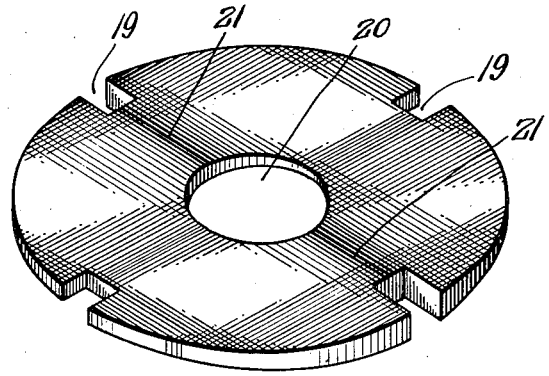

The clutch plates are shown in perspective in Figs. 2 and 3. The clutch plates of Fig. 2 are typical as to disc form and the provision of central opening 14, and notches 15 for seating and movement on the keys 11 fixed in slots formed in the shaft at 10. The improvement in this plate resides in the provision of inclined faces 16 which extend from opposite peripheral edges of the plate and merge at approximately a medial line 17 across the structure. It will be noted that the angle of inclination of the faces is such that the thickness of the clutch disc at its reduced center is about one-half the thickness at the opposite peripheral edges 18.

The clutch plate of Fig. 3 is notched at diametrically opposite points 19 to receive the ribs 8, riveted in the clutch housing 7, and is formed with the central shaft opening 20, of such diameter as to travel freely about the shaft portion 10.

Figure 4:
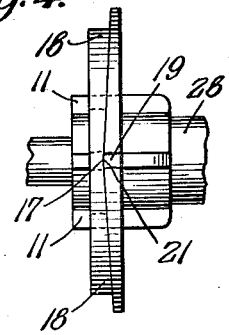
Fig. 4 is a side elevation showing the plates in engaging position.

The faces 21 of this disc taper from a transverse central line outwardly to opposite peripheral edges, so that, upon engagement, a perfect seat is possible throughout the entire surface, i. e., the reduced medial transverse portion of one disc receives the thickened medial transverse portion of the other disc. This complementary clutch plate arrangement, during actual engagement is shown clearly in Fig. 4.

Referring again to Fig. 1 it will be noted that filler plate 22 is included to provide for the proper alignment of the parts. A plate 24 is located adjacent the outer plate, and carries the actuating fingers 25 through which pressure is applied from cone 26 and suitable operating mechanism. An adjusting nut 27 is threaded on the enlarged shaft extension 28 and cooperates with the fingers 25, permitting regulation of the parts effecting the throw of the clutch. The nut 27 is locked in position on the shaft extension 28 by means of thread lock 29.

The actuation of the cone 26 and the clutch parts thereby is conventional. Likewise the operation of the reverse gear by the clutch band 30 shown in section in Figure 1 is well known in the art.

The foregoing assembly provides a mechanism in which loss of power, due to slippage, is avoided and consequent wear is practically entirely eliminated. The use of the cast iron clutch plates having oppositely inclined semi-circular faces, 35 also reduces to a minimum the resistance on the actuating lever of the clutch as a progressive frictional to positive engagement of the drive and driven elements is effected without strain upon the parts. It will be noted that the parts are so designed as to be removable for repair and replacement, and are interchangeable when desired.

Modifications of the structure herein described may be suggested to those skilled in the art to which the invention pertains, but it is to be understood that my invention includes all embodiments falling fairly within the scope of the appended claims.

I claim:—

1. In combination with a drive and a driven shaft, a clutch including a pair of independently movable thrust plates, a disc formed with inclined angular faces extending from opposite peripheral edges inward to a substantially central medial line, and a companion disc formed with oppositely inclined faces extending from a medial line outwardly to opposite peripheral edges, said discs being interposed between said thrust plates for frictional engagement therewith and for positive engagement with each other when said thrust plates are moved into frictional engagement with said discs.

2. In a device of the class described having a drive and a driven shaft, a thrust plate carried by the drive shaft and freely surrounding the driven shaft, a second thrust plate splined on the driven shaft for movement independently of the drive shaft, a pair of clutch discs each having plain outer faces interposed between said thrust plates and adapted to be frictionally engaged by the opposed plain faces of said thrust plates, said clutch discs having oppositely inclined semi-circular faces extending from transverse medial lines across the opposed faces thereof, and means for positively moving one of said thrust plates toward the other, whereby a progressive frictional positive engagement of said plates and discs is effected without undue strain upon the drive and driven shafts.

JOSEPH A. RUSSO